Patented Nov. 22, 1927.

1,650,090

UNITED STATES PATENT OFFICE.

WILHELM NEELMEIER, OF LEVERKUSEN, NEAR COLOGNE, AND THEODOR NOCKEN, OF WIESDORF, NEAR COLOGNE, GERMANY, ASSIGNORS TO GRASSELLI DYESTUFF CORPORATION, OF NEW YORK, N. Y., A CORPORATION OF DELAWARE.

PROCESS OF PREPARATION OF AZO DYESTUFFS.

No Drawing. Application filed May 7, 1926, Serial No. 107,486, and in Germany May 12, 1925.

This invention relates to a process for preparing azo dyestuffs.

In our United States Patent No. 1,602,776, dated October 12, 1926, a process for the preparation of azo dyestuffs is described, according to which arylsulfoalkylaminonaphthol-sulfonic acids are coupled with diazo, diazo-azo, tetrazo compounds or the intermediate products from a tetrazo compound and one molecule of an azo component.

We have now found that the same dyestuffs are obtained if the dyestuffs obtainable from the above mentioned diazotized components with alkylaminonaphthol-sulfonic acids are treated with arylsulfochlorides in the presence of reagents which combine with acid.

The invention is illustrated by the following examples:

(1) The diazo solution prepared in the usual way from 137 parts by weight of o-phenetidine, 69 parts by weight of sodium nitrite, and the required amount of hydrochloric acid, is allowed to run with stirring into a solution cooled to 0° of 391 parts by weight of the disodium salt of 1-ethylamino-8-naphthol-3.6-disulfonic acid, in 2000 parts by weight of water and 106 parts by weight of soda. When the coupling is finished the dyestuff is salted out with sodium chloride and suction filtered. It is then dissolved in 1000 parts by weight of water and treated with 106 parts by weight of soda. Then p-toluolsulfochloride is added in small portions at 80° until the color of the solution no longer becomes more red. The reaction may be graphically illustrated by the following equation:

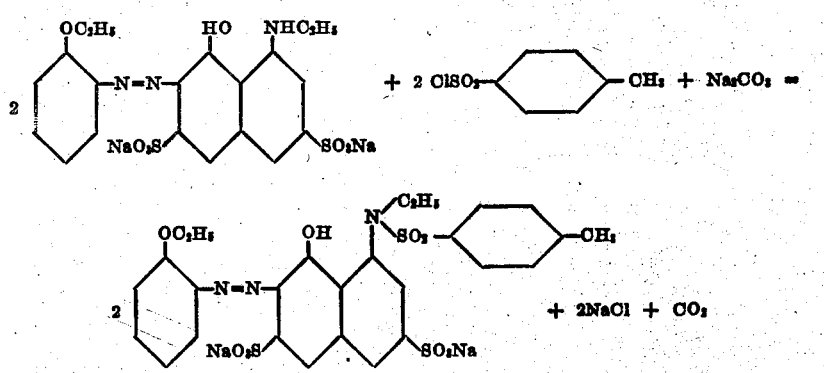

The dyestuff is precipitated with sodium chloride. It is identical with the dyestuff described in Example 1 of U. S. Patent No. 1,602,776.

(2) The diazo solution prepared according to Example 2 of U. S. Patent No. 1,602,776 from 510.5 parts by weight of anilin-2.5-disulfonic acid-azo-3-amino-4-cresol-ethylether having most probably the formula

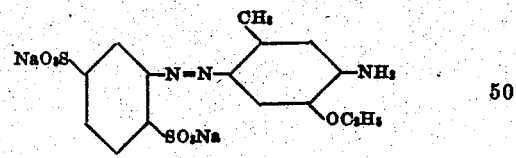

is run into a solution of 275 parts by weight of the sodium salt of 2-methylamino-8-naphthol-6-sulfonic acid in 2000 parts by weight of water and 175 parts by weight of soda. After coupling is complete the dyestuff is salted out, dissolved in water, and treated with 164 parts by weight of sodium acetate. Then salicylic acid sulfochloride is introduced at 70° until the solution no longer becomes redder.

The reaction may be graphically illustrated by the following equation:

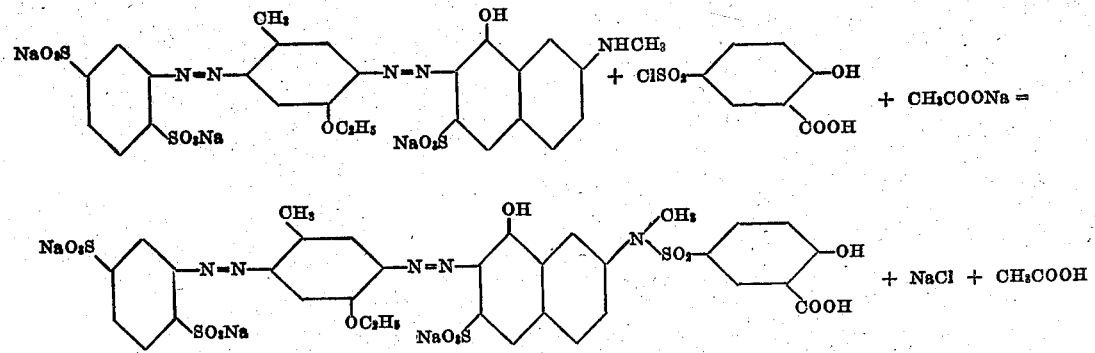

The dyestuff is salted out with sodium chloride and, if necessary, it is re-dissolved. It is identical with the dyestuff described in Example 2 of U. S. Patent No. 1,602,776.

This application is a continuation in part of our copending application, Serial No. 6658 filed February 3, 1925, which has now matured into U. S. Patent No. 1,602,776, dated October 12, 1926.

We claim:

1. The process of producing new azodyestuffs which comprises treating the reaction product formed by combining a diazotized aromatic amine and an alkylamino-naphthol-sulfonic acid, with an arylsulfochloride in the presence of a mineral acid binding agent.

2. The process of producing a new azodyestuff which comprises treating the reaction product formed by combining diazotized alinine - 2.5 - disulfonic acid-azo - 3 - amino-4-cresolethylether and 2-methylamino-8-naphthol-6-sulfonic acid, with salicylic acid sulfochloride in the presence of a mineral acid binding agent.

3. As a new product, the azodyestuff which is substantially identical with the dyestuff obtainable by treating the reaction product formed by combining diazotized aniline-2.5-disulfonic acid-azo - 3 - amino-4-cresol-ethylether and 2-methylamino-8-naphthol-6-sulfonic acid, with salicylic acid sulfochloride in the presence of a reagent which combines with acid, which dyestuff is a bronzy-bluish violet powder, soluble in water with a bluish-violet color, soluble in concentrated sulphuric acid with a blue color, dyeing wool in an acid bath bluish-violet shades which are not much changed by after-chroming, and which printed on cotton with chrome acetate produces bluish-violet shades of excellent fastness to chlorine and washing.

In testimony whereof, we affix our signatures.

WILHELM NEELMEIER.
THEODOR NOCKEN.